(12) United States Patent
Lissner et al.

(10) Patent No.: US 6,636,606 B1
(45) Date of Patent: Oct. 21, 2003

(54) KEYPAD BUTTON GUARD

(76) Inventors: Dale R. Lissner, 23605 SW. Boones Ferry Rd., Tualatin, OR (US) 97062; Sheryl L. Lissner, 23605 SW. Boones Ferry Rd., Tualatin, OR (US) 97062

( * ) Notice: Subject to any disclaimer, the term of this patent is extended or adjusted under 35 U.S.C. 154(b) by 0 days.

(21) Appl. No.: 09/514,116

(22) Filed: Feb. 28, 2000

Related U.S. Application Data

(60) Provisional application No. 60/152,321, filed on Sep. 4, 1999.

(51) Int. Cl.[7] ............................................. H04M 1/00
(52) U.S. Cl. .................................................. 379/451
(58) Field of Search ........................ 379/368, 369, 379/433.06, 433.07, 447, 451; 340/547; 200/304

(56) References Cited

U.S. PATENT DOCUMENTS

| | | | | |
|---|---|---|---|---|
| 3,491,221 A | * | 1/1970 | Zammarra | .................. 379/447 |
| 3,746,818 A | * | 7/1973 | Bertelloti | .................. 200/304 |
| 4,438,300 A | * | 3/1984 | Morse | .................. 379/447 |
| 4,751,731 A | * | 6/1988 | O'Connor | .................. 379/452 |
| 5,365,570 A | * | 11/1994 | Boubelik | .................. 379/369 |
| 5,473,310 A | * | 12/1995 | Ko | .................. 340/547 |

* cited by examiner

*Primary Examiner*—Jack Chiang
(74) *Attorney, Agent, or Firm*—Olson and Olson

(57) ABSTRACT

A keypad button guard member is provided for a keypad type device, the button guard member arranged to provide a raised, encircling edging which may be releasably applied to a keypad device to encircle and provide a protective barrier about one or more selected buttons on the keypad device to prevent accidental and unintentional contact and depressing of the button and consequent activation of that button's function.

6 Claims, 1 Drawing Sheet

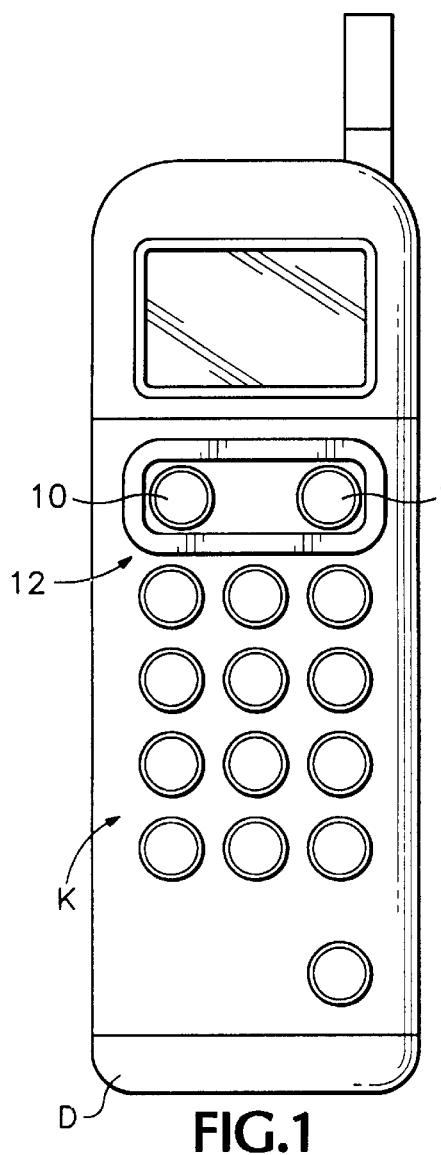
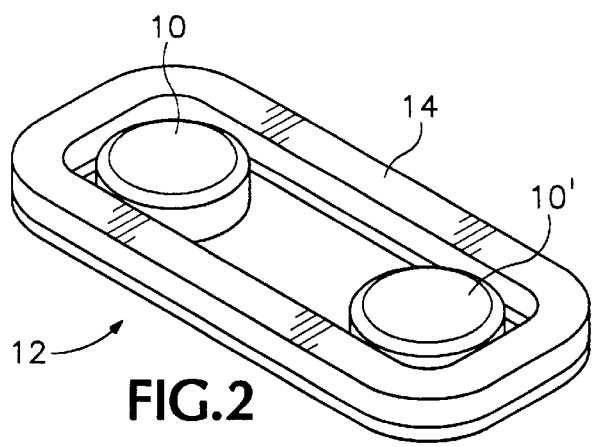
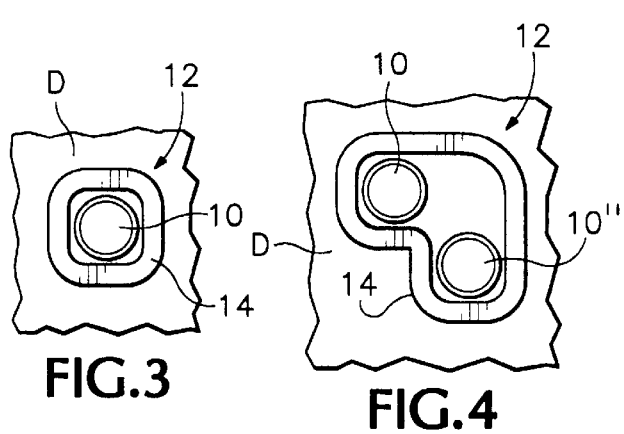
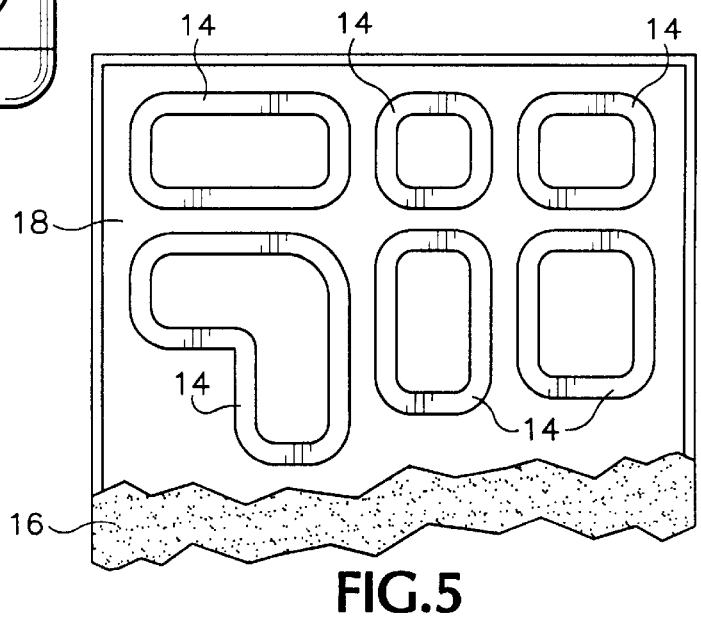
FIG.1
FIG.2
FIG.3
FIG.4
FIG.5

KEYPAD BUTTON GUARD

This application claims the benefit under 35 U.S.C. 119(e) of the priority filing of U.S. Provisional application Ser. No. 60/152,321, Filed Sep. 4, 1999.

This invention relates to devices such as cell phones, cordless phone, remote controls and the like that utilize a plurality of push buttons in key pad arrangements of various types, and more particularly to a button-surrounding guard member for one or more selected buttons of a key pad to prevent inadvertent, accidental and undesirable activation of the protected button.

Virtually everyone has at one time experienced the occasion of inadvertently pressing a button on a key pad device, most often a telephone, (either a land-line type, cordless type or cellular type) when picking the device up or even while holding in hand during its use. Cell phone owners unfortunately more frequently encounter such occurrences because cell phones are becoming very small in size; are used in highly mobile and less-than-stable circumstances; and are often carried loose in pockets, purses and other environments where phone buttons are highly susceptible to becoming inadvertently depressed and activated during jostling of the phone in storage between uses.

While the mis-pressing or inadvertent pressing of buttons often results in inconvenience such as unintended "hang-up" with phones, and accidentally "turned-off" televisions and stereos, etc., inadvertently-activated "send" and emergency-dial buttons can cause particularly serious problems for cell phone users. The obvious impact of a pre-programmed emergency call number being activated by a cell phone being jostled in a purse or pocket is easily recognized by all. But as too many cell phone owners have unhappily discovered, as soon as the send or call button on a cell phone is activated, charges are incurred, and left unattended in such an active condition, those charges can become very high before the problem is eventually discovered by the owner.

Manufacturers of cell phones have made various provisions to minimize such occurrences such as providing cell phones at manufacture with protective, hinged panels arranged to cover the key pad when the cell phone is not in use. Also, many of these phones incorporate programs that require a physical input by the operator to "lock out" or prevent activation of the keyboard and thereby stop accidentail initiation of phone functions. However because of the steps involved to lock out the numeric key pad, users tend not to utilize the function.

While steps such as these do attend to the problem with respect to phones and devices so provided prior to purchase by a user, there is simply no provision made for devices that do not incorporate these safety features, and of course those devices already owned and in use. Therefore it is apparent to those skilled in the art that a need exists in the marketplace for an easy and cost efficient way to retroactively upgrade a key pad device to protect it against undesirable and inadvertent activation of one or more of its selected buttons.

SUMMARY OF THE INVENTION

In its basic concept this invention provides a raised, button-encircling guard member having an adhesive backing arranged to secure the guard member to the face of a key pad device in button-encircling condition about one or more selected buttons to be guarded, the guard member having a sufficient thickness to shield the encircled button against casual and inadvertent depressing contact.

It is by virtue of the foregoing basic concept that the principal objective of this invention is achieved; namely, the provision of a key pad button guard that is quickly and easily applicable to virtually any key pad device to protect against inadvertent activation of a selected button function without interfering with normal, intentional activation of the button.

Another object of this invention is the provision of the key pad button guard of the class described which may be provided in a multitude of various configurations arranged to encircle virtually any button or combinations of adjacent buttons as may be desired or needed.

Another object of this invention is the provision of a key pad button guard of the class described which is of simplified construction for economical manufacture and ease of use.

The foregoing and other objects and advantages of this invention will appear from the following detailed description, taken in connection with the accompanying drawings of a preferred embodiment.

BRIEF DESCRIPTION OF THE DRAWINGS

FIG. 1 is a schematic plan view of a button key pad device, embodied herein as a cellular phone having a button guard member embodying features of this invention applied thereto, the guard member of this embodiment configured to encircle and guard two adjacent buttons of the key pad.

FIG. 2 is a perspective view of the guard member of FIG. 1 on an enlarged scale to show closer detail.

FIG. 3 is a fragmentary plan view of a second embodiment of the button guard of this invention configured to encircle and guard a single button of a key pad.

FIG. 4 is a fragmentary plan view of a third embodiment of the button guard of this invention configured to encircle and guard two adjacent buttons disposed in an angular relationship relative to each other on a key pad.

FIG. 5 is a fragmentary, schematic plan view of a sheet of adhesive-backed material having a plurality of various button guard punch-outs formed or cut thereinto to illustrate one form of production and sales of the invention for virtual universal use in connection with after-market upgrading of key pad devices.

DESCRIPTION OF THE PREFERRED EMBODIMENT

The drawings illustrate a few configurations of key pad button guards provided by the present invention as will be apparent to those skilled in the art. A device D, illustrated herein as a cellular telephone, includes an array of buttons forming a key pad K which can be of any arrangement or layout. As will be understood, one or more buttons 10, 10', 10" may be selected for protection by a button guard member of this invention, illustrated generally at 12.

As seen best in FIG. 2 of the drawings, the button guard member 12 is formed as a pad of material having a predetermined peripheral shape and a cutaway, central open portion extending therethrough forming a ring member 14 so configured as to surround and enclose one or more buttons of a key pad arrangement as illustrated in FIGS. 2, 3 and 4. This pad or ring member 14 may be formed of any suitable material as may be deemed best for the intended purpose including, but not limited to, paper product and dense foam material if a degree of flexibility of the ring member is desired in order to conform to surface contours of a key pad device, or of rigid material such as plastics or metals if rigidity and inflexibility is desired. Preferably, the ring member is provided of flexible materials such as polyethylene, polypropylene, vinyl, nylon, rubber, and the like that provide a suitable degree of flexibility without a high degree of resiliency.

As is apparent, the pad or ring member 14 is formed with a predetermined thickness in cross section. As shown in FIG. 2, the thickness of the ring member is preferably sufficient to provide a raised edge about a button extending into the hollow central confines of the ring member, the raised edge being substantially or approximately equal to or greater than the length of the button portion extending from the surface of the keypad device. At minimum, the top of the applied button guard member should be above the point at which activation of the button function occurs as the button is depressed.

Means is provided for securing the ring member 14 to the surface of a key pad device, and in this regard the most expedient and preferred securing means is the provision of an adhesive layer to the underside of the ring member. This adhesive is preferably provided in the form of a double sided adhesive tape 16, well known in the art, having a preselected adhesion strength sufficient to positively attach the button guard member to the key pad device and against shifting on and dislodgement from the key pad device during anticipated use of the device. The adhesive strip 16 may also provide for intentional removal of the ring member from the key pad device without marring or damaging the keypad device by selecting an adhesive strip material that allows for intended removability. These adhesive strips are also well known in the art. An adhesive backing strip (not shown) typically of a paper material easily removed from the adhesive layer of the adhesive strip is provided to protect the adhesive layer prior to use as is typical.

As mentioned previously, the pad of material may be provided so as to enable a ring member 14 to be formed with virtually any peripheral configuration, and corresponding interior opening configuration, as may be needed or desired to accommodate positioning to enclose and surround one or more buttons of a key pad layout. FIGS. 2, 3 and 4 illustrate three different examples of a virtually limitless number of various button guard cofigurations available with this invention to encircle and protect one or more buttons of a key pad device of virtually any make, manufacture and function.

FIG. 5 illustrates another envisioned form of the present invention wherein the pad material is formed as an elongated sheet 18 having an adhesive layer 16 applied to its back side. The sheet material may be cut or stamped at manufacture so as to provide a plurality of button guard ring members 14. As illustrated, the ring members 14 may be provided in a variety of different configurations in order to accommodate virtually any arrangement of different button combinations that may be needed by a purchaser. As should be evident, a user could simply select a desired ring configuration and simply peel the preformed, precut ring member 14 from the sheet for application to his device. This would provide an extremely versatile product that could be provided at an extremely nominal cost of manufacture.

The installation and operation of the button guard of this invention is readily recognizable by simply viewing the drawings. A ring member 14 is selected for its particular configuration and size as needed to provide protection for one or more of the buttons on a key pad device. Once a ring member is selected, the protective adhesive backing paper is removed (if so provided) and the ring member 14 is positioned so as to enclose the selected button (10, 10', 10") closely thereabout while still allowing unrestricted movement of the button within the center opening of the guard member. The guard member is then pressed on about its surface area to positively adhere the adhesive layer to the surface of the device, and the installation procedure is thus complete.

As will be readily apparent, with the encircling ring member 14 of the guard member providing a raised, protective edge about the button, incidental depressing of the button is virtually prevented. Intentional pressing of the button as with the tip of the finger however is effective in depressing the button since the finger when pressing down on the button guard and the button itself is resilient enough and elastic enough to extend into the opening sufficiently to move the button to activate its function. Random brushing of a finger over the guard or random contact with objects in a pocket or a handbag will clearly not effect depressing of the button of the device except possibly and only in the most peculiar of instances.

From the foregoing it will be apparent to those skilled in the art that the present invention provides an extremely simple and cost-effective device to produce that also is capable of accommodating virtually any button and even combinations of buttons on a key pad device to prevent accidental and unknowing activation of the function of those buttons of the device. It will also be apparent to those skilled in the art that various changes, other than those already described, may be made in the size, shape, type, number and arrangement of parts described hereinbefore without departing from the spirit of this invention and the cope of the appended claims.

Having thus described my invention and the manner in which it may be made, we claim:

1. A button guard member for application onto the key pad face surface of a key pad device having a key pad array comprising at least three buttons, the button guard member for protecting against unintentional activation of a selected single button or a button of any selected adjacent pair of buttons of the key pad array of the device, the button guard member comprising:

a) a ring member having a preselected cross sectional height and forming a single closed ring having a single interior opening therethrough, said single closed ring having a selected one of alternative ring shapes, said alternative ring shapes being limited to a first ring shape configured to surround and freely confine within said single interior opening only a selected single button of the key pad array and a second ring shape configured to surround and freely confine within said interior opening only a selected adjacent pair of buttons of the key pad array, said preselected height of said ring member being sufficient to provide a surrounding raised edge to inhibit depressing and activating a confined button of said key pad array, and b) adhering means on the underside of said ring member for securing said ring member onto the key pad face surface of a key pad device, c) whereby said raised edge of the surrounding button guard ring member prevents unintentional activation of a confined button while allowing free, unaltered access to all non-confined buttons of the key pad array of the key pad device.

2. The button guard member of claim 1 wherein said ring member is configured with a ring shape to surround and freely confine within said single interior opening only a selected adjacent pair of buttons of the keypad array of a key pad device.

3. The button guard member of claim 1 wherein said height of said ring member and said adhering means together is at least as great as the height of the top of said selected single button or said selected adjacent pair of buttons extending above the face surface of a key pad device in the inoperative condition of said single button or adjacent pair of buttons.

4. The button guard member of claim 1 wherein said ring member is formed of a flexible, non resilient material.

5. The button guard member of claim 1 wherein a plurality of individual said ring members having individual selected said ring shapes are provided in pre-cut form on a single sheet of preselected material having an adhesive layer backing applied to said individual ring members, whereby individual, pre-cut ring members may be selectively removed from said sheet of material and positioned and adhered to said face surface of a key pad device in position to freely surround and provide a raised edging about said selected single button or said selected adjacent pair of buttons of said key pad array of a key pad device.

6. The-button guard member of claim 1 wherein said ring member is configured with a ring shape to surround and freely confine within said single interior opening only a selected single button of the key pad array of a key pad device.

* * * * *